US008826590B2

(12) United States Patent  
Cross et al.

(10) Patent No.: US 8,826,590 B2  
(45) Date of Patent: Sep. 9, 2014

(54) PLANTER BAG

(76) Inventors: John M. Cross, Santa Fe, NM (US); Russell G. Hamilton, Santa Fe, NM (US); Sattva Ananda, Boulder, CO (US)

( * ) Notice: Subject to any disclaimer, the term of this patent is extended or adjusted under 35 U.S.C. 154(b) by 658 days.

(21) Appl. No.: 13/182,361

(22) Filed: Jul. 13, 2011

(65) Prior Publication Data

US 2012/0011773 A1    Jan. 19, 2012

Related U.S. Application Data

(60) Provisional application No. 61/363,953, filed on Jul. 13, 2010.

(51) Int. Cl.
*A01G 9/02* (2006.01)
*A01G 23/04* (2006.01)
*A01G 9/10* (2006.01)

(52) U.S. Cl.
CPC ............... *A01G 9/102* (2013.01); *A01G 23/04* (2013.01); *A01G 9/026* (2013.01)
USPC .................................. 47/65.8; 47/66.7; 47/76

(58) Field of Classification Search
USPC ............ 47/65.8, 73, 65.5, 65.7, 66.7, 74, 75, 47/76, 78
See application file for complete search history.

(56) References Cited

U.S. PATENT DOCUMENTS

| | | | |
|---|---|---|---|
| 1,820,040 A | 8/1931 | Zuckerman | |
| 2,097,929 A * | 11/1937 | Lovett, Jr. | 47/84 |
| 2,850,842 A * | 9/1958 | Eubank, Jr. | 47/58.1 R |
| 3,094,810 A * | 6/1963 | Kalpin | 47/73 |
| 3,469,341 A * | 9/1969 | Bourget et al. | 47/74 |
| 3,550,318 A * | 12/1970 | Remke et al. | 47/76 |
| 3,550,662 A * | 12/1970 | Remke et al. | 383/76 |
| 3,962,823 A | 6/1976 | Zipperer, III | |
| 4,109,442 A * | 8/1978 | Maasbach | 53/452 |
| 4,287,682 A | 9/1981 | Browne | |
| 4,646,470 A * | 3/1987 | Maggio | 47/76 |
| 4,918,861 A * | 4/1990 | Carpenter et al. | 47/59 R |
| 5,060,420 A | 10/1991 | Bergman | |
| 5,241,783 A | 9/1993 | Krueger | |
| 7,272,911 B2 | 9/2007 | Gatliff | |
| 2001/0007184 A1 | 7/2001 | Lee | |
| 2005/0241231 A1 | 11/2005 | Bissonnette | |
| 2006/0005466 A1 | 1/2006 | Atchley | |
| 2006/0026897 A1* | 2/2006 | Glover | 47/65.8 |
| 2006/0042161 A1* | 3/2006 | L'Estrange | 47/65.8 |
| 2006/0150508 A1 | 7/2006 | Whitcomb | |
| 2007/0101646 A1 | 5/2007 | Licht | |
| 2008/0276526 A1 | 11/2008 | Tsai | |
| 2009/0205249 A1 | 8/2009 | Rubin | |
| 2010/0000149 A1* | 1/2010 | Ouellet et al. | 47/32.7 |
| 2010/0172601 A1 | 7/2010 | Lin | |

* cited by examiner

*Primary Examiner* — Monica Williams
(74) *Attorney, Agent, or Firm* — Gina T. Constant, Esq.

(57) ABSTRACT

A self-mulching planter bag that is tapered such that the diameter is larger at the top providing for easy removal of the bag from the root mass. It can be used for transplantation where a user can place a planter bag into a larger planter bag as the plant grows. The larger planter bag has space for the smaller bag through the use of a core feed plug which, when removed from the larger bag, leaves a void that is equal or greater to the size of the smaller bag. The larger bag can be pre-filled with designer soils especially suited for the particular plant. The planter bag also incorporates attachment points that can be used to train the plant or to attach the bags to surfaces or even to each other. Interconnected planter bag configurations can be used in a variety of applications including erosion control and environmental restoration.

19 Claims, 10 Drawing Sheets

PLANTER BAG

This application claims priority to and the benefit of the filing of U.S. Provisional Patent Application Ser. No. 61/363,953 entitled "Planter Bag," filed on Jul. 13, 2010, and the specification thereof is incorporated herein by reference.

FIELD OF THE INVENTION

The present invention relates to a device and method for a planter bag for growing and transplanting plants. Further, multiple planter bags of the present invention can be interconnected to create a modular garden that can be used for a number of purposes, including erosion control and environmental reclamation.

This invention materially enhances the quality of the environment of mankind by contributing to the restoration or maintenance of the basic life-sustaining natural elements.

BACKGROUND OF THE INVENTION

There is a need in the horticulture industry to make a product like this invention that conserves resources and reduces the carbon footprint of the user by significantly eliminating the plastic that the traditional plastic planter pot uses. The present invention also saves storage space due to the collapsible nature of its material and it is reusable, washable and modular. Additionally, the interconnectable and modular nature of this invention makes it unique in the field as it provides for almost endless configuration possibilities. Further, there is a need for a system that would offer people an educational, dependable step by step system that takes the guess work out of growing your own food in an urban or rural environment.

While there are examples in the prior art of plant containers, none have the advantages of the present invention.

For instance, U.S. Patent Application No. 2010/0172601 to Lin discloses a covering mesh bag that utilizes a drawstring and zipper.

U.S. Pat. No. 5,241,783 to Krueger discloses a growing medium container for growing plants above ground.

U.S. Patent Application No. 2006/0005466 to Atchley discloses a plant growing apparatus comprised of a mesh-like bag secured by connectors to a plurality of legs.

U.S. Pat. No. 7,272,911 to Gatliff discloses a root management system that includes the selection of designer soils.

U.S. Patent Application No. 2006/0150508 to Whitcomb, et al, discloses a plant container system comprised of plant containers fastened to a rigid spacer.

But nothing in the prior art provides the unique benefits afforded by the present invention.

SUMMARY OF THE INVENTION

The apparatus and method of the present invention is comprised of a planter bag that is self-mulching because the top of the bag can be closed while leaving an opening from which the plant can emerge. The self-mulching system contains applied water and assists with self cooling of the pot. It also extends root growth to the upper most levels of the medium.

The planter bag may be made of a variety of materials, including but not limited to pressed, synthetic, non-synthetic, woven, non-woven, extruded, needled, slit, punched, punctured, perforated, vulcanized, hydroprolific, or non-hydroprolific, transparent, non-transparent, self-wicking, moisture retaining, moisture resisting, organic, inorganic, aerated, non-aerated, printable, non-printable, biodegradable, non-biodegradable, stamped, cut, or dye cut materials.

If the planter bag is made of self-wicking material, then it can be placed in a tray of water and the medium will be able to absorb adequate amounts of water. In fact, water may be introduced to the outside or inside of the planter bag in any number of ways and the self-wicking properties of the fabric will allow for adequate watering of the plant.

The planter bag is tapered such that the diameter of the top of the bag is larger than the diameter of the bottom. This provides for easy removal of the bag from the root mass or medium by pulling the top of the bag over and outside of itself until entire medium or root ball is exposed. This aids in the washing and reuse of the planter bag and inspection of the root mass. This tapering also increases the possibility of air flow between planter bags when set near or adjacent to each other. Air space between planter bags' side walls prevent anaerobic activity and achieve an even air circulation on, in or around the planter bag, medium or root ball. Buckles, snaps, clasps, fasteners or zippers can be used to increase or decrease the diameter or circumference aiding in ease of removal or inspection of the bag from the medium or root ball.

The top of the planter bag may be opened and closed using, for example, a drawstring cable. The drawstring pulls excess fabric down and around the root mass/medium for the purpose of self-mulching, root productivity, root protection, the prevention of soil contamination, and discouraging evaporation. It also enables the product to be sealed. Further, when planter bags are attached together in an interconnected configuration, the transference of water and moisture is achieved resulting in the use of less water. This in turn results in less frequent watering and lowers the possibility of shock to the plant from getting too dry.

When the top of the planter bag is in the closed position it may be watered from the outside by pouring water on top of the bag, letting the bag rest in a puddle of water, or even completely submerging the bag in water, all without disturbing the soil.

The planter bag may incorporate a zipper or other attachment means for side or bottom removal of the medium or root mass or for inspection and observation of the medium or root mass.

A drip tube-type of water emitter may be installed in the top of the planter bag through a second hole near the top end allowing it to be hooked up to an irrigation system for easier and more efficient watering of the medium or root mass. The second hole can double as a grab hole for easy lifting and carrying of the planter bag.

The planter bag may incorporate a roots window for easy inspection and observation of the medium and root mass. The window may be created using stitches, snaps, zippers, buttons, hook and loop fasteners, or the like, and may include a viewing door or window to visually inspect root development. It may be positioned vertically or horizontally on the side or on the bottom of the planter bag.

The planter bag also incorporates one or more attachment points to accept straps, handles, clasps pins, stakes, nails, or the like, to aid in lifting, hanging, hoisting or anchoring the planter bag to the ground or other surface. The attachment points can be created by cinching the fabric bag with a drawstring cable in one or more locations. The attachment points can be used to train the plant by, for instance, widening the canopy to promote the growth of more stalks. The attachment points can also be used to create a trellis for the plant. Additionally, the attachment points can be used as a handle and when a closed bag is carried in this manner, the plant and soil do not fall out.

The planter bag's plurality of attachment points also allows for the bags to be connected together in any configuration. For instance, the planter bags can be attached together and filled with plants appropriate for erosion control. The root system of the interconnected planter bag configuration creates a buffer that holds soil particles together. This alleviates wind and water erosion of soil.

By way of example, this interconnected planter bag configuration can be set above ground or planted underground for erosion control of hillsides in areas prone to mudslides. It could also be used to stabilize stream banks by providing protection against substantial erosion. It could also be used for dune restoration since wind-blown sand from the beach can be trapped and stabilized by salt-tolerant native dune vegetation. A healthy dune becomes a sand source for the beach during storm events and creates a flood barrier for structures behind the dune.

By way of further example, this interconnected planter bag configuration can be used to create a bioswale, which is designed to remove silt and pollution from surface runoff water by providing a swaled drainage course filled with interconnected planter bags. The configuration of interconnected planter bags is designed to direct water's flow path to maximize the time water spends in the swale, which aids the trapping of pollutants and silt. A common application is around parking lots, where substantial automotive pollution is collected by the paving and then flushed by rain.

Further, the interconnected planter bag configuration can be attached to an anchoring means underwater to restore, for example, wetlands or coral reefs.

As a final example, the interconnected planter bag configuration can be placed generally vertically in order to form an indoor living wall, i.e., one that is partially or completely covered with vegetation. This has multiple beneficial effects. First, such a wall reduces the overall temperature of the room minimizing the need for air conditioning. Additionally, such a wall can provide a means for water reuse because the plants purify slightly polluted water (such as greywater) by absorbing dissolved nutrients. Further, such a wall is ideal for arid climates, as the circulating water on a vertical wall is less likely to evaporate than in horizontal gardens. Finally, indoor living walls provide a natural air purification system relieving the symptoms of "sick building syndrome." There are many more practical uses of an interconnected system of the planter bags of the present invention and the recitation of examples above is not meant to limit the scope of this application in any way.

The planter bag of the present invention can be used in a modular application wherein a user can transplant a plant with a root ball, or a plant in a smaller container, or a plant in a smaller planter bag, into a larger planter bag as the plant grows. The larger planter bag will have space for the plant to be transplanted through the use of a core feed plug which, when removed from the larger bag, leaves a void that is equal or greater to the size of the smaller bag, thus enabling an easier and more efficient transplantation process. The core feed plug contains designer top dressing, which is comprised of a proprietary mix of nutrients designed specifically for the particular plant. The larger planter bag contains designer soil medium, which can be a soil or a soil-less medium, designed specifically for the particular plant. After the smaller plant is placed in the space left by the removal of the core feed plug, the top dressing is poured into the planter bag and mixed with the top layers of the designer soil medium. The planter bag is then closed to activate the self-mulching feature of the invention.

The planter bag containing designer soil medium and a core feed plug that contains designer top dressing can also be provided to a user as a kit with instructions for growing and transplanting a plant.

As demonstrated above, the planter bag of the present invention contributes in many ways to the restoration or maintenance of the basic life-sustaining natural elements, i.e., air, water, sand and soil.

Additionally, the planter bag encourages and enables people to grow their own food leading to a smaller ecological footprint. The invention makes urban gardening accessible to the general population.

The planter bag is reusable and washable and uses approximately 80% less plastic than tradition planter or flower pots. In one embodiment, the planter bag is made of biodegradable material. All of this results in less non-degradable materials in our landfills and waterways.

The combination of interconnected planter bags used for erosion control directly restores or maintains the ecosystems of our rivers, wet lands, lakes, beaches and waterways.

Interconnected planter bags filled with oil absorbing and or transforming (oil consuming bacteria substrates) agents may also be used to absorb oil or stop the migration of oil from an oil spill to land.

The planter bags can be configured for use as an urban roof garden, which has a significant cooling affect during the warmer seasons as well as insulating the building, resulting in lower heating and cooling costs. Also, it results in cleaner air quality due to less greenhouse gas emissions.

DETAILED DESCRIPTION

Figure 1:
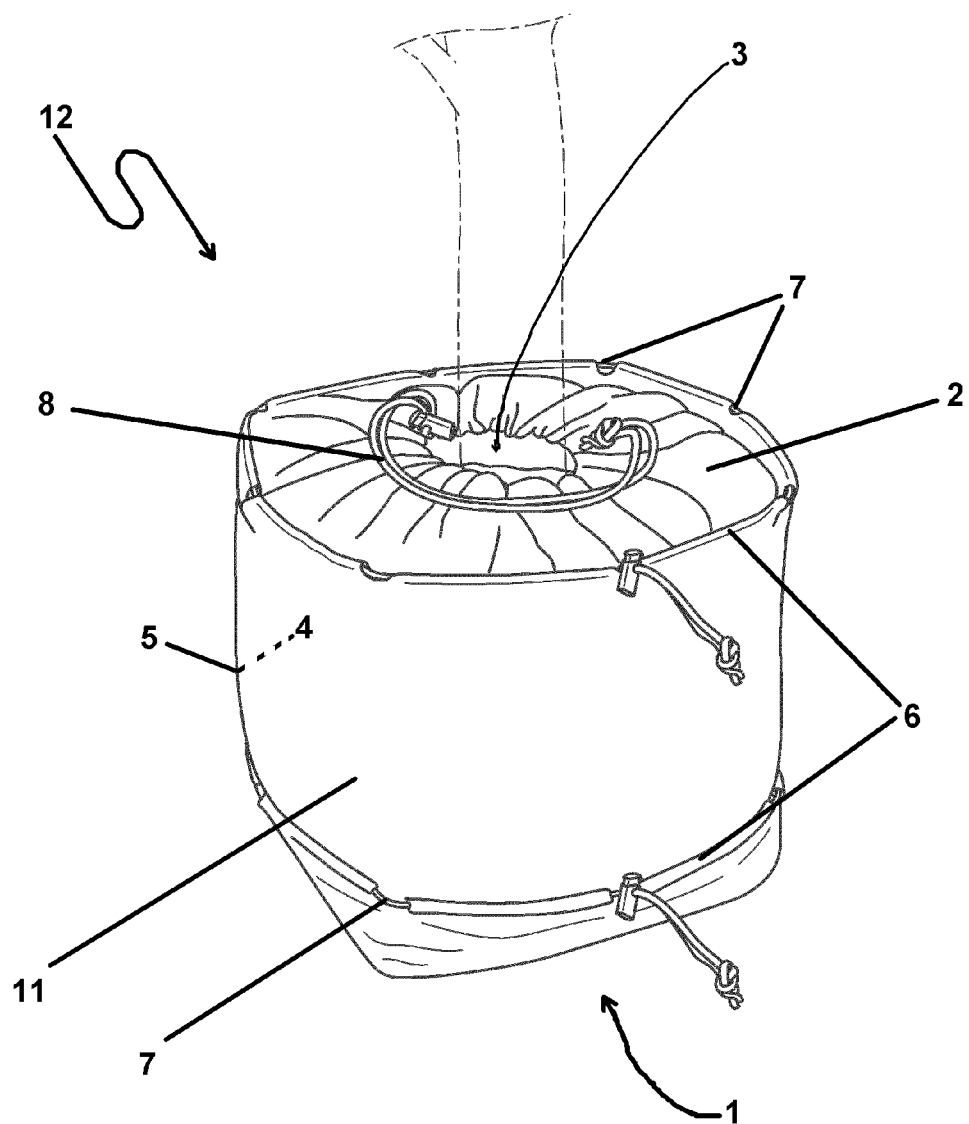
FIG. 1 is a perspective view of the planter bag where the top end is in the closed position.

With reference to FIG. 1, a planter bag 12 for growing plants is shown, the planter bag 12 comprising a fabric bag 11 having a bottom end 1 that is closed and a top end 2 that is capable of being in both an open position and a closed position, a means for moving the top end from the open position to the closed position and back to the open position 8, an opening in the top end when the top end is in the closed position 3, the fabric bag having an internal surface 4 and an external surface 5, and at least one means for cinching the fabric bag 6, the cinching means 6 providing a plurality of attachment points 7 on the external surface 5 of the fabric bag 11. The fabric bag 11 is tapered such that the diameter of the fabric bag at the top end 2 is larger than the diameter of the fabric bag at the bottom end 1. In the preferred embodiment, the means for converting the top end from the open position to the closed position 8 is a drawstring and the cinching means 6 is also a drawstring. Also in the preferred embodiment, there are two cinching means 6, one located around the circumference of the bottom end 1 of the fabric bag 11, and the other located around the circumference of the top end 2 of the fabric bag 11 when the fabric bag 11 is in the closed position. In one embodiment of the present invention, the fabric bag 11 is biodegradable.

Figure 2:
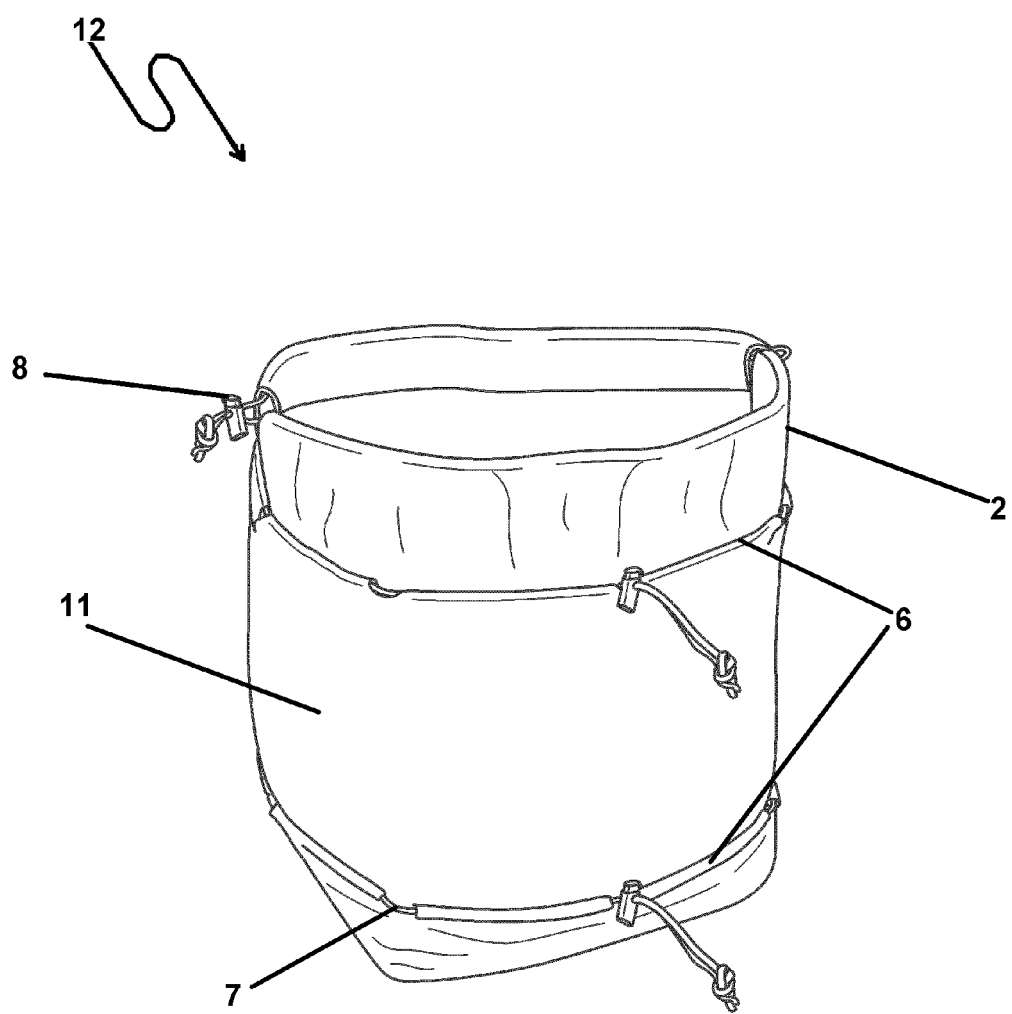
FIG. 2 is a perspective view of the planter bag where the top end is in the open position.

FIG. 2 shows the planter bag 12 with the top end 2 in the open position.

Figure 3:
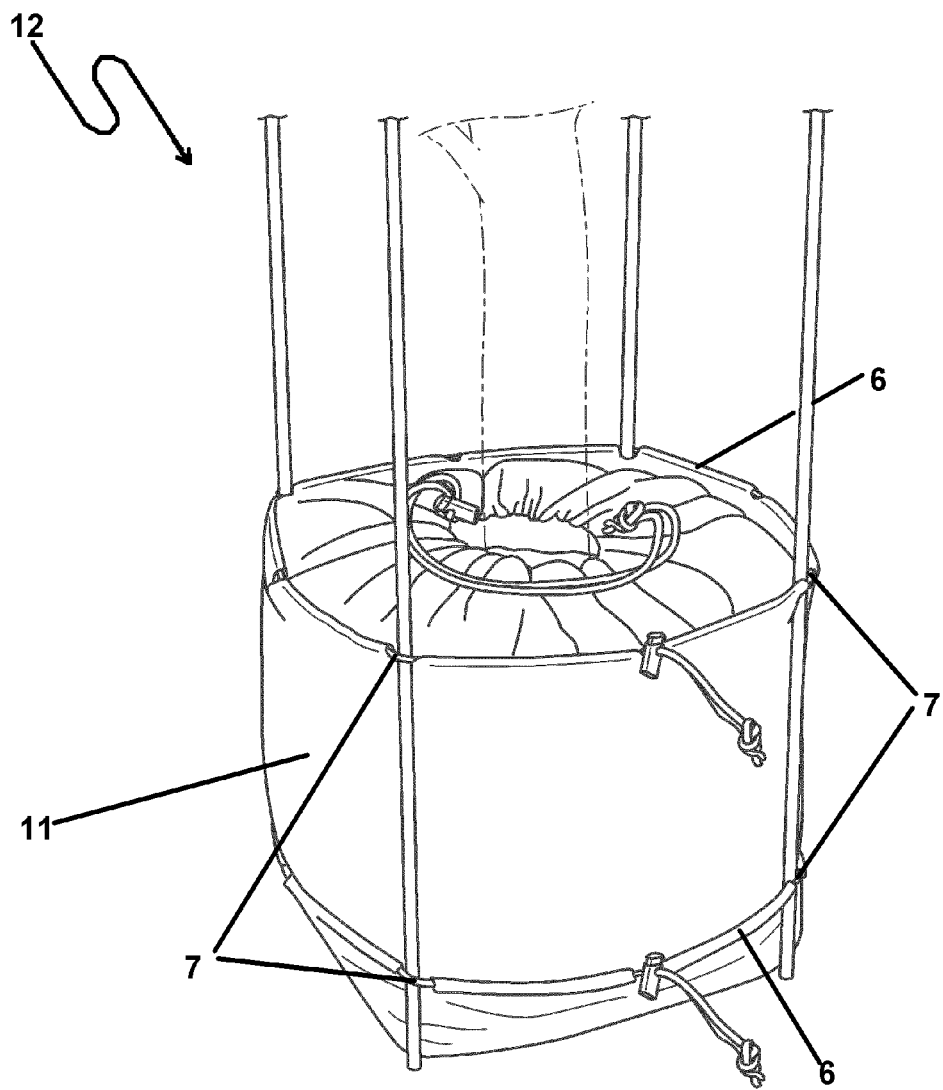
FIG. 3 is a perspective view of the planter bag attached to stakes in a vertical position.
Figure 4:
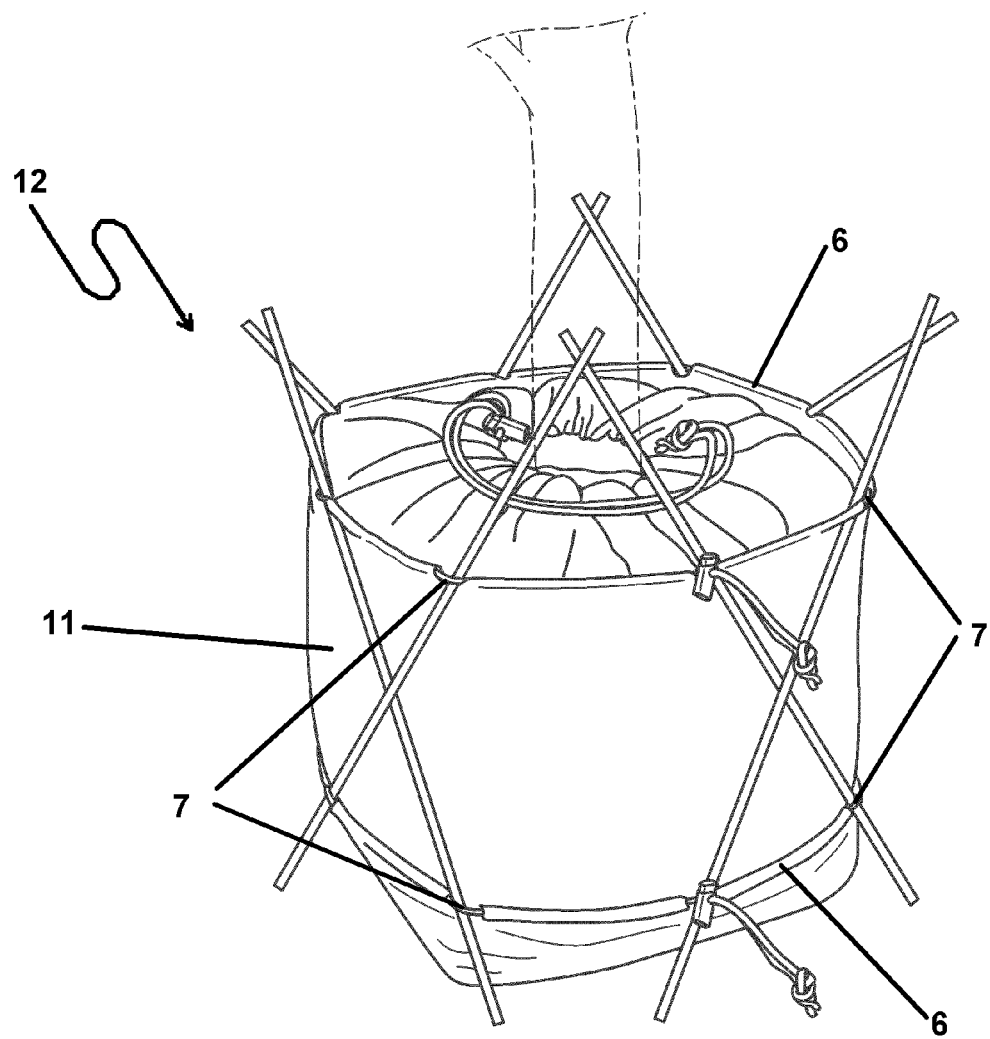
FIG. 4 is a perspective view of the planter bag attached to stakes in a crossed vertical position.

In FIGS. 3 and 4, the planter bag 12 is shown anchored down with stakes being driven through a number attachment points 7.

Figure 5:
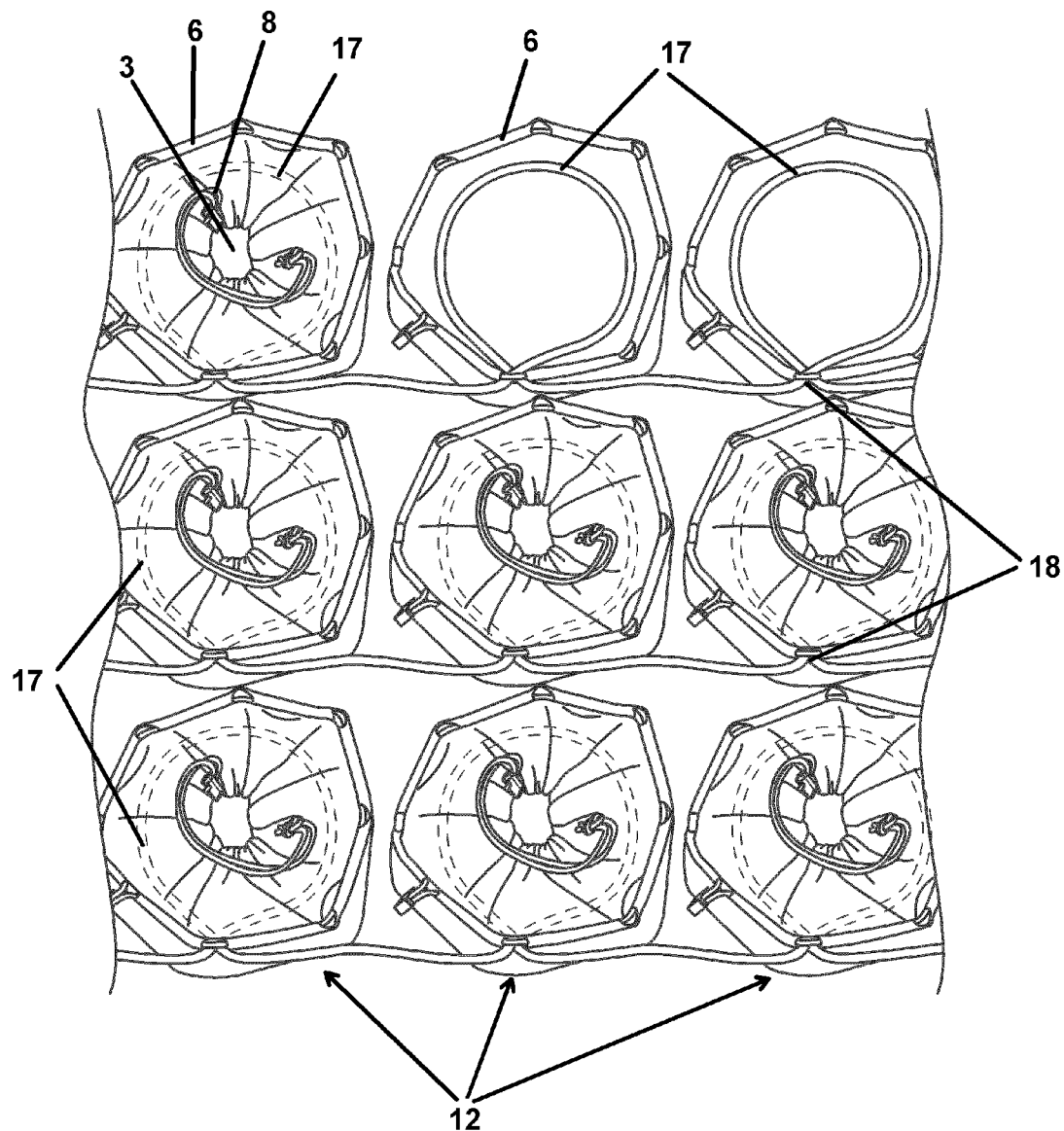
FIG. 5 is a top view of a plurality of planter bags with water emitter hoses hooked up to an irrigation system.

FIG. 5 shows a series of planter bags 12 each with a water emitter hose 17 entering the planter bag 12 through a second opening 18 in the planter bag 12.

Figure 6:
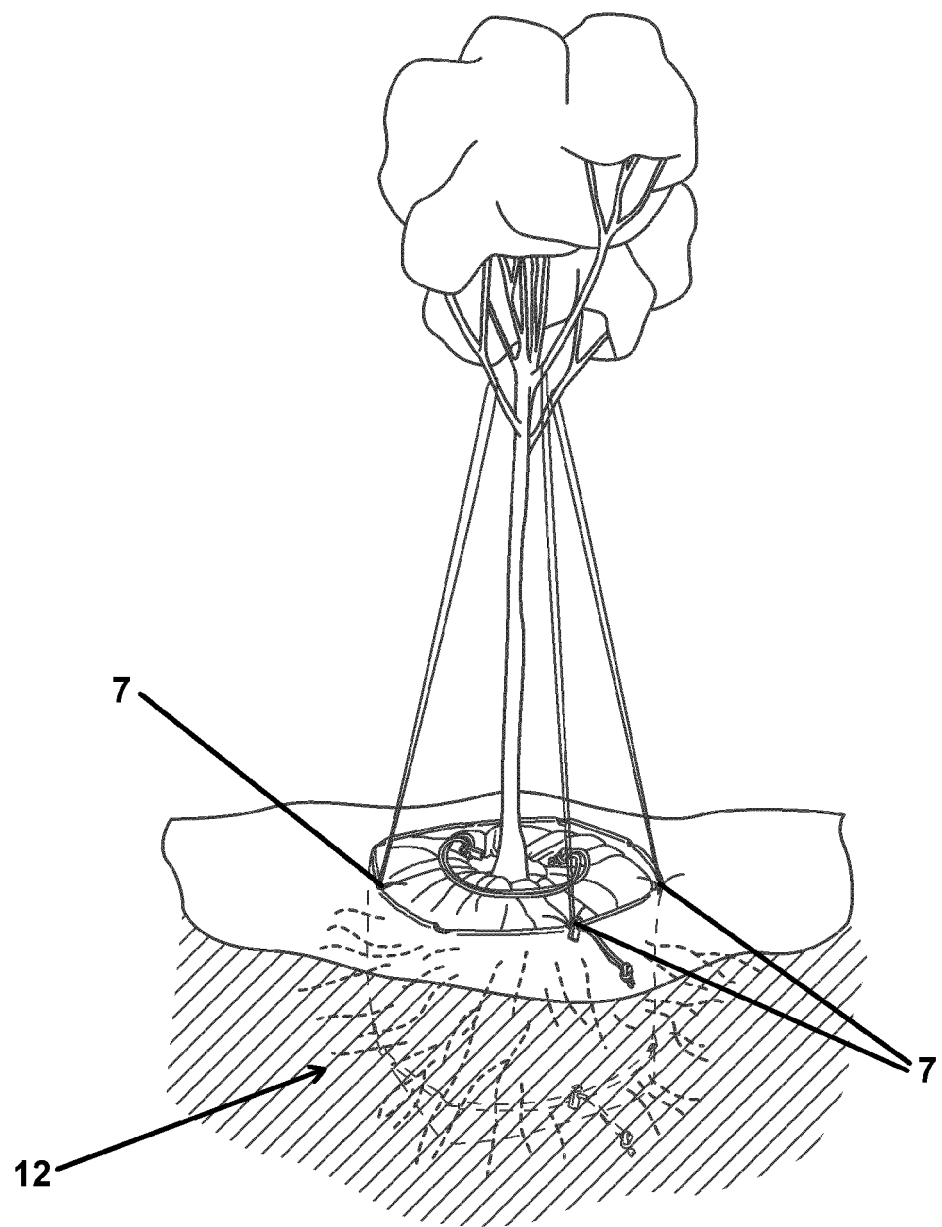
FIG. 6 is a perspective view of the planter bag and plant planted in the ground with the attachment points being used to train the plant.

With reference to FIG. 6, the planter bag 12 is shown planted underground with roots growing through the planter bag 12. FIG. 5 also demonstrates how the attachment points 7 can be used to train the plant.

Figure 7:
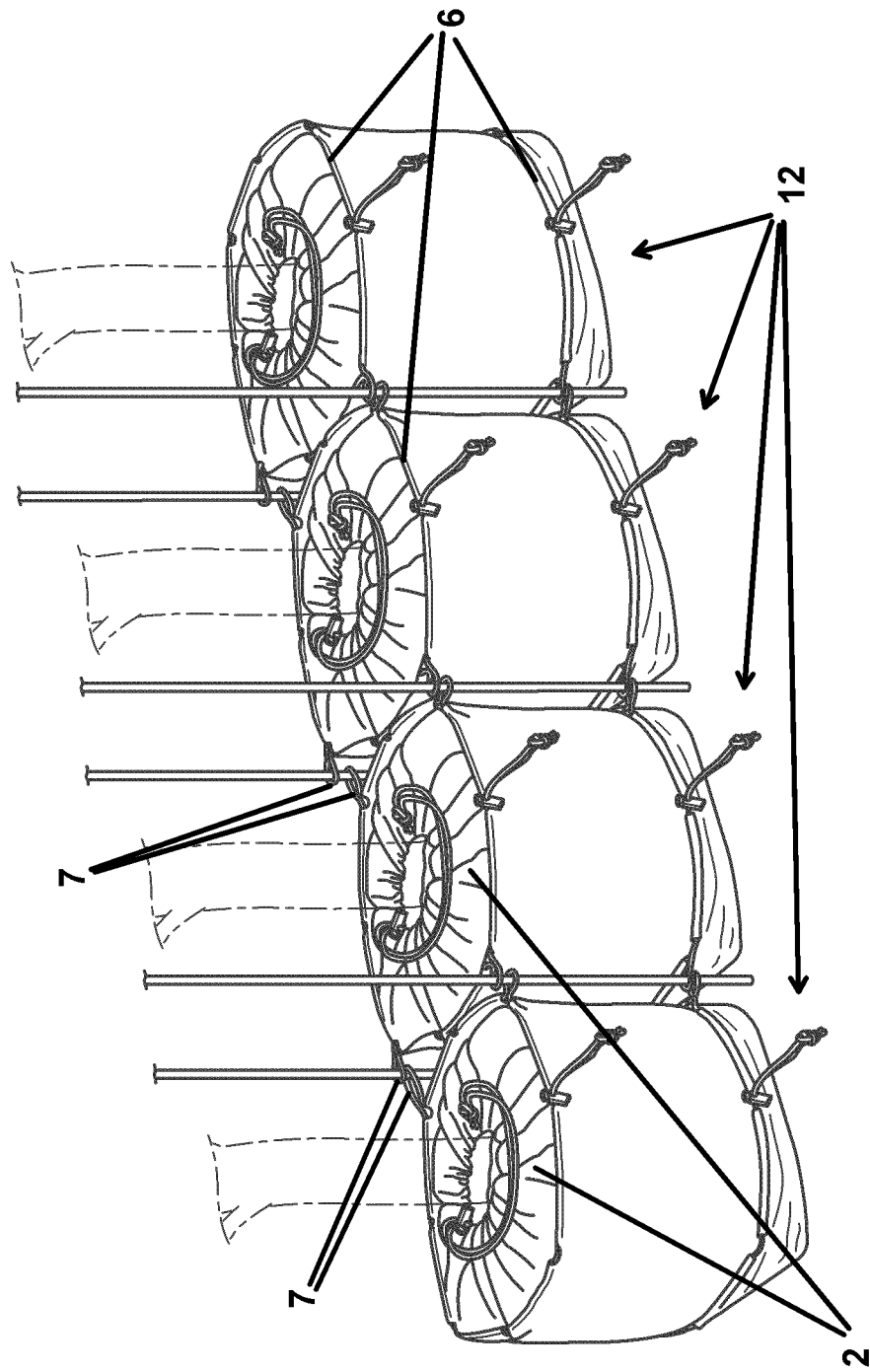
FIG. 7 is a view of interconnected planter bags.

FIG. 7 shows a plurality of planter bags 12 interconnected using the following method: planting plants in a plurality of the planter bags 12, moving the top ends 2 of the fabric bags 12 from the open position to the closed position such that the plants are allowed to emerge through the openings in the top ends 2, tightening the cinching means 6 on the fabric bags 12 thereby providing attachment points 7, and attaching the fabric bags 12 together using the attachment points 7. The planter bags 12 are then placed in a configuration suitable for the intended purpose.

Figure 8:
FIG. 8 is a view of interconnected planter bags that have been used to create a modular garden.

FIG. 8 shows just one of many embodiments of a modular garden 20 created by interconnected planter bags, specifically, a vertical indoor living wall. The modular garden 20 could also be in the horizontal position and configured for an urban garden, a bioswale, erosion control or dune restoration, just to name a few applications of the present invention.

Figure 9:
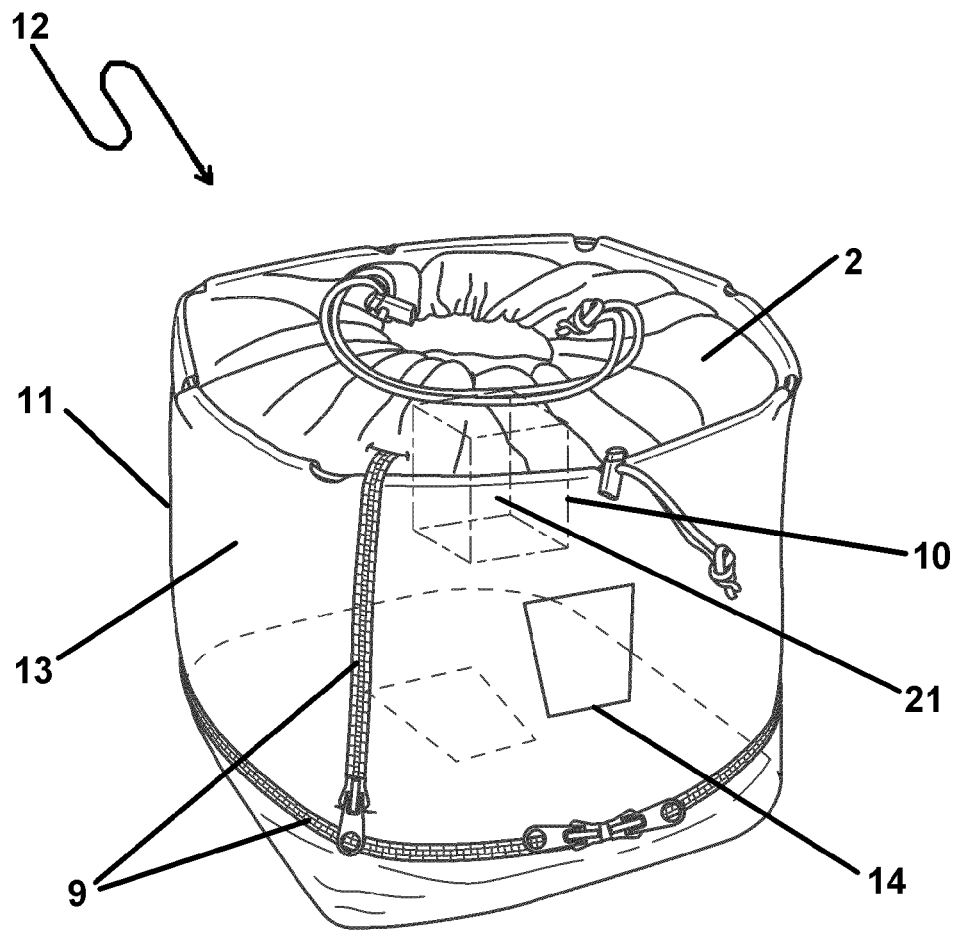
FIG. 9 is a perspective view of the planter bag containing designer soil medium and core feed plug and including zippers and roots window.

With reference to FIG. 9, the planter bag may be used for transplanting or as a kit and comprises a core feed plug 10 located within the fabric bag 11, the core feed plug 10 comprising a container filled with a designer top dressing 21, the core feed plug 10 being removable through the top end 2 of the fabric bag 11 when the top end 2 is in the open position. The planter bag 12 further comprises a quantity of designer soil medium 13 located within the fabric bag 11, the quantity being such that it is sufficient to surround and support the core feed plug 10. There is also a transparent section 14, or roots window, for viewing the condition of the soil medium 13. One or more zippers 9 may be used to view the condition of the soil medium 13 or to facilitate removal of the plant or medium from the fabric bag 11.

Figure 10:
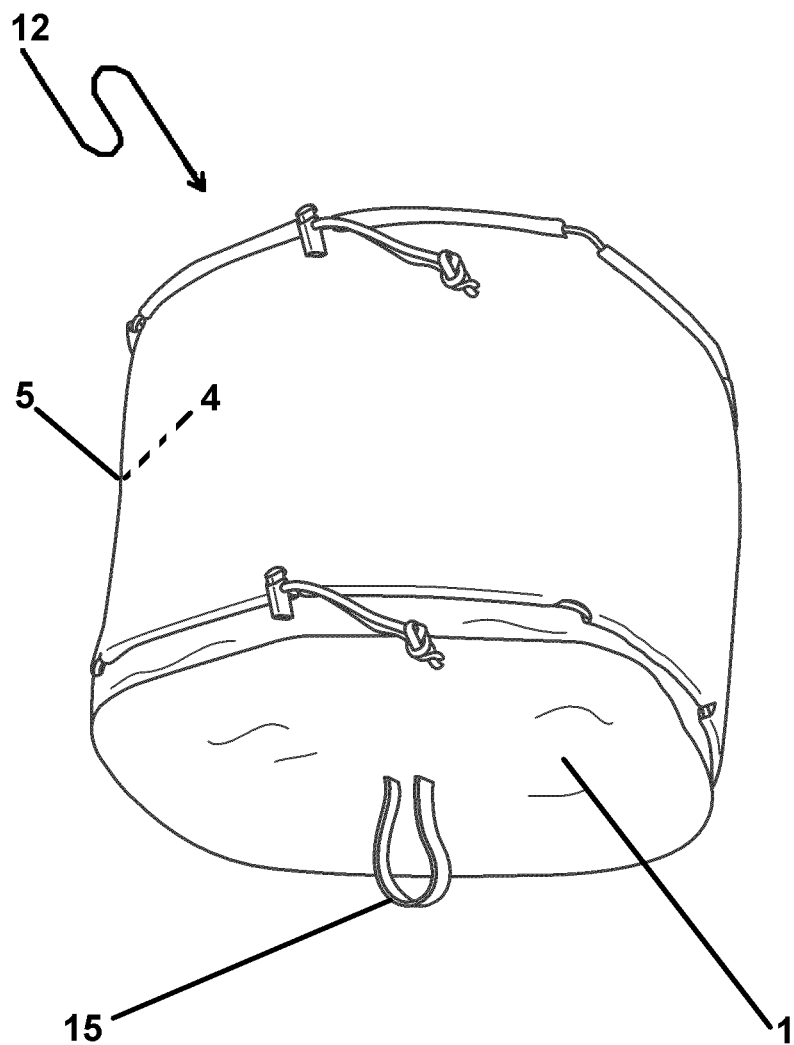
FIG. 10 is a perspective view of the bottom of the planter bag showing a pull tab.

FIG. 10 shows the location of a pull tab 15, the pull tab 15 being attached to the external side 5 of the bottom end 1 of the planter bag 12.

The planter bag 12 shown in FIGS. 9 and 10 can be used to transplant plants. In this embodiment of the present invention, the core feed plug 10 is removed through the open top end 2 and a space in the designer soil medium 13 is created that is approximately the same size as the core feed plug 10. A plant in a container that is approximately the same size as the core feed plug 10 can then be inserted into the space in the designer soil medium 13 that was left by the removal of the core feed plug 10. The container can be another, smaller planter bag 12 of the present invention since the roots will grow through the fabric bag 11 and into the designer soil medium 13. The designer top dressing 21 is then poured into the planter bag 12 and mixed with the designer soil medium 13 located near the top of the plant. The planter bag 12 is then closed to activate the self-mulching feature of the invention.

As the plant is cultivated, the root ball will fill the planter bag 12. The planter bag can also have a roots window 14 installed in the fabric bag 11, where the roots window is a transparent section for viewing the condition of the soil medium. After peering through the roots window and determining that the plant is ready to be transplanted to a second, even larger planter bag 12, the plant can be removed from the first planter bag 12 by opening the top end 2 and freeing the root ball from the interior side 4 of the first planter bag 12. This step can be facilitated by providing a pull tab 15, the pull tab 15 being attached to the external side 5 of the bottom end 1 of the planter bag 12, and pulling on the pull tab 15 while freeing the root ball of the plant from the interior side 4 of the bottom end 1 of the planter bag 12. The steps of the previous paragraph are then followed to complete the transplantation to a second, larger, planter bag 12.

The above method can also practiced using a plant having a root ball, the root ball being approximately the same size as the core feed plug 10, instead of using a plant in a container.

Whereas the figures and description have illustrated and described the concept and preferred embodiment of the present invention, it should be apparent to those skilled in the art that various changes may be made in the form of the invention without affecting the scope thereof. The detailed description above is not intended in any way to limit the broad features or principles of the invention, or the scope of patent monopoly to be granted.

We claim:

1. A planter bag for growing plants comprising:
   a. a fabric bag having a bottom end that is closed and a top end that is capable of being in both an open position and a closed position;
   b. a means for moving the top end from the open position to the closed position and back to the open position;
   c. an opening in the top end when the top end is in the closed position;
   d. the fabric bag having an internal surface and an external surface;
   e. at least one means for cinching the fabric bag, the cinching means providing a plurality of attachment points on the external surface of the fabric bag;
   f. a core feed plug located within the fabric bag comprising a container filled with a designer top dressing, the core feed plug being removable through the top end of the fabric bag when the top end is in the open position; and
   g. a quantity of designer soil medium located within the fabric bag, the quantity being such that it is sufficient to surround and support the core feed plug.

2. The planter bag of claim 1 wherein the fabric bag is tapered such that the diameter of the fabric bag at the top end is larger than the diameter of the fabric bag at the bottom end.

3. The planter bag of claim 1 wherein the means for converting the top end from the open position to the closed position is a drawstring.

4. The planter bag of claim 1 wherein the means for cinching the fabric bag is a drawstring.

5. The planter bag of claim 1 wherein there are two cinching means one located around the circumference of the bottom end of the fabric bag, and the other located around the circumference of the top end of the fabric bag when the fabric bag is in the closed position.

6. The planter bag of claim 1 wherein the fabric bag is biodegradable.

7. The planter bag of claim 1 further comprising a transparent section for viewing the condition of the soil medium.

8. The planter bag of claim 1 further comprising a pull tab, the pull tab being attached to the external side of the bottom end of the planter bag.

9. The planter bag of claim 1 further comprising a second opening and a water emitter hose, the water emitter hose entering the planter bag through the second opening.

10. A method of creating a modular garden comprising:
   a. providing a plurality of the planter bags of claim 1;
   b. planting plants in the planter bags;
   c. moving the top ends of the fabric bags from the open position to the closed position such that the plants are allowed to emerge through the openings in the top ends;
   d. tightening the cinching means on the fabric bags thereby providing attachment points on the external surfaces of the fabric bags;
   e. placing the planter bags in a configuration suitable for the intended purpose; and
   f. attaching the fabric bags together using the attachment points.

11. A method of transplanting a plant comprising:
   a. providing the planter bag of claim 1;
   b. providing the core feed plug located within the fabric bag comprising a container filled with a designer top dressing, the core feed plug being removable through the top end of the fabric bag when the top end is in the open position;
   c. providing the quantity of designer soil medium located within the fabric bag, the quantity being such that it is sufficient to surround and support the core feed plug;
   d. providing a plant in a second container, the second container being approximately the same size as the core feed plug;
   e. removing the core feed plug through the top end while the top end is in the open position, thereby creating a space in the designer soil medium that is approximately the same size as the core feed plug;
   f. inserting the second container into the space;
   g. pouring the designer top dressing from the core plug into the planter bag through the top end;
   h. mixing the designer top dressing with the designer soil medium; and
   i. moving the top end of the planter bag from the open position to the closed position.

12. The method of claim 11 wherein the second container is a planter bag for growing plants comprising:
   a. a fabric bag having a bottom end that is closed and a top end that is capable of being in both an open position and a closed position;
   b. a means for moving the top end from the open position to the closed position and back to the open position;
   c. an opening in the top end when the top end is in the closed position;
   d. the fabric bag having an internal surface and an external surface; and
   e. at least one means for cinching the fabric bag, the cinching means providing a plurality of attachment points on the external surface of the fabric bag.

13. The method of claim 11 further comprising the steps of:
   a. cultivating the plant until its root ball fills the planter bag;
   b. moving the top end of the planter bag from the closed position to the open position;
   c. removing the planter bag while freeing the root ball of the plant from the interior side of the planter bag;
   d. providing a second larger planter bag of claim 1 having a second core feed plug approximately the same size as the root ball and having a second quantity of designer soil medium;
   e. removing the second core feed plug through the top end of the second larger planter bag while the second top end is in the open position, thereby creating a second space to accommodate the root ball;
   f. inserting the root ball into the second space;
   g. pouring the designer top dressing from the second core plug into the second larger planter bag through the top end of the second planter bag;
   h. mixing the second designer top dressing with the designer soil medium of the second planter bag; and
   i. moving the top end of the second planter bag from the open position to the closed position.

14. The method of claim 13 further comprising the steps of providing a pull tab, the pull tab being attached to the external side of the bottom end of the planter bag, and pulling on the pull tab while freeing the root ball of the plant from the interior side of the bottom end of the planter bag.

15. The method of claim 13 further comprising the steps of providing the second planter bag with a transparent section.

16. A method of transplanting a plant comprising:
   a. providing the planter bag of claim 1;
   b. providing the core feed plug located within the fabric bag comprising a container filled with a designer top dressing, the core feed plug being removable through the top end of the fabric bag when the top end is in the open position;
   c. providing the quantity of designer soil medium located within the fabric bag, the quantity being such that it is sufficient to surround and support the core feed plug;
   d. providing a plant having a root ball, the root ball being approximately the same size as the core feed plug;
   e. removing the core feed plug through the top end while the top end is in the open position, thereby creating a space in the designer soil medium approximately the same size as the core feed plug;
   f. inserting the root ball into the space;
   g. pouring the designer top dressing from the core plug into the planter bag through the top end;
   h. mixing the designer top dressing with the designer soil medium; and
   i. moving the top end of the planter bag from the open position to the closed position.

17. The method of claim 16 further comprising the steps of:
   a. cultivating the plant until its root ball fills the planter bag;
   b. moving the top end of the planter bag from the closed position to the open position;
   c. removing the planter bag while freeing the root ball of the plant from the interior side of the planter bag;
   d. providing a second larger planter bag of claim 1 having a core feed plug approximately the same size as the root ball and having a second quantity of designer soil medium;
   e. removing the second core feed plug through the top end of the second larger planter bag while the second top end is in the open position, thereby creating a second space to accommodate the root ball;
   f. inserting the root ball into the second space;
   g. pouring the designer top dressing from the second core plug into the second larger planter bag through the second top end;
   h. mixing the second designer top dressing with the second designer soil medium; and i. moving the second top end of the second planter bag from the open position to the closed position.

18. The method of claim 17 further comprising the steps of providing a pull tab, the pull tab being attached to the external side of the bottom end of the planter bag, and pulling on the pull tab while freeing the root ball of the plant from the interior side of the bottom end of the planter bag.

19. The method of claim 17 further comprising the steps of providing the second planter bag with a transparent section.

* * * * *